(12) United States Patent
Zambon

(10) Patent No.: US 9,279,517 B2
(45) Date of Patent: Mar. 8, 2016

(54) VALVE ASSEMBLY, IN PARTICULAR FOR USE IN PNEUMATIC NETWORKS

(75) Inventor: Ivan Zambon, Alessandria (IT)

(73) Assignee: SAFEN FLUID AND MECHANICAL ENGINEERING S.R.L., Turin (IT)

( * ) Notice: Subject to any disclaimer, the term of this patent is extended or adjusted under 35 U.S.C. 154(b) by 0 days.

(21) Appl. No.: 13/981,405

(22) PCT Filed: Jan. 26, 2012

(86) PCT No.: PCT/IB2012/050363
§ 371 (c)(1),
(2), (4) Date: Jul. 24, 2013

(87) PCT Pub. No.: WO2012/101593
PCT Pub. Date: Aug. 2, 2012

(65) Prior Publication Data
US 2013/0306890 A1 Nov. 21, 2013

(30) Foreign Application Priority Data
Jan. 28, 2011 (IT) .............................. TO2011A0073

(51) Int. Cl.
*F16K 47/16* (2006.01)
*F15B 3/00* (2006.01)
(Continued)

(52) U.S. Cl.
CPC . *F16K 47/16* (2013.01); *F15B 3/00* (2013.01); *F15B 13/025* (2013.01); *F16K 11/027* (2013.01); *G05D 7/0146* (2013.01)

(58) Field of Classification Search
CPC ..................................................... F16K 47/16
USPC ........... 137/895, 87.01, 492.5, 488, 486, 487, 137/502; 251/123, 124
See application file for complete search history.

(56) References Cited

U.S. PATENT DOCUMENTS 1,514,839 A * 11/1924 Edwards et al. .............. 137/460
2,550,390 A * 4/1951 Stephanoff ........................ 241/1
(Continued)

FOREIGN PATENT DOCUMENTS

CH 584941 2/1977
WO 02/04848 A1 1/2002

OTHER PUBLICATIONS

PCT/ISA/220 Notification of Transmittal of the International Search Report and the Written Opinion of the International Searching Authority, or the Declaration, mailed on May 2, 2012; PCT/ISA/210 International Search Report, completed on Apr. 20, 2012, and mailed on May 2, 2012; and PCT/ISA/237 Written Opinion of the International Searching Authority mailed May 2, 2012, for corresponding PCT International Application No. PCT/IB2012/050363 filed on Jan. 26, 2012.

*Primary Examiner* — John K Fristoe, Jr.
*Assistant Examiner* — Christopher Ballman
(74) *Attorney, Agent, or Firm* — Heslin Rothenberg Farley & Mesiti P.C.; Victor A. Cardona, Esq.

(57) ABSTRACT

A valve assembly for use in a pneumatic network, includes a body having a first inlet port and a first air discharge port. A main duct includes a convergent portion, a restricted-section portion having a variable area of passage, and a divergent portion. An actuator assembly includes an intake volume and a second inlet port in fluid communication with the intake volume by valve means provided for enabling intake of a second fluid flow through the second inlet port and towards the intake volume, wherein the second fluid flow is drained off through the first discharge port together with the first fluid flow.

9 Claims, 6 Drawing Sheets

(51) Int. Cl.
*F15B 13/02* (2006.01)
*F16K 11/02* (2006.01)
*G05D 7/01* (2006.01)

(56) References Cited

U.S. PATENT DOCUMENTS

| | | | |
|---|---|---|---|
| 3,386,458 A * | 6/1968 | Wasserman et al. | 137/114 |
| 3,474,812 A * | 10/1969 | Robertson | 137/81.1 |
| 3,526,240 A * | 9/1970 | Oroza | 137/81.1 |
| 3,581,762 A * | 6/1971 | Bracki | 137/271 |
| 3,598,288 A * | 8/1971 | Posgate | 222/644 |
| 3,930,518 A * | 1/1976 | Fuller et al. | 137/487 |
| 4,607,659 A * | 8/1986 | Cole | F16K 11/027 137/454.2 |
| 5,427,151 A | 6/1995 | Pauley | |
| 5,538,027 A * | 7/1996 | Adamson et al. | 137/7 |
| 6,539,315 B1 * | 3/2003 | Adams et al. | 702/47 |
| 6,783,329 B2 * | 8/2004 | Vilela et al. | 417/189 |
| 6,857,444 B2 * | 2/2005 | Davis | B08B 3/026 137/115.06 |
| 7,114,517 B2 * | 10/2006 | Sund et al. | 137/487.5 |
| 7,131,451 B2 * | 11/2006 | Nugent | G01F 1/42 137/12 |
| 8,573,247 B2 * | 11/2013 | Ushigusa et al. | 137/486 |
| 2004/0089827 A1 | 5/2004 | Drechsel | |
| 2010/0163652 A1 * | 7/2010 | Kajuch | B05B 7/0425 239/548 |
| 2013/0032223 A1 * | 2/2013 | Kornfeld | B01F 5/0428 137/115.11 |

* cited by examiner

VALVE ASSEMBLY, IN PARTICULAR FOR USE IN PNEUMATIC NETWORKS

CROSS REFERENCE TO RELATED APPLICATIONS

This application is a 371 National Phase of PCT International Application No. PCT/IB2012/050363 filed on Jan. 26, 2012, and published in English as WO 2012/101593 A1 on Aug. 2, 2012, which claims priority to Italian Patent Application No. TO2011A000073 filed on Jan. 28, 2011, the entire disclosures of which are incorporated herein by reference.

FIELD OF THE INVENTION

The present invention relates to a valve assembly that is able to process a certain flow of fluid, in particular air. In greater detail, the present invention relates to a valve assembly designed, in particular, for use in pneumatic networks.

DESCRIPTION OF THE PRIOR ART

In the vast majority of industrial activities and in general in all activities in which compressed air is used as working fluid (for example, laboratories, building sites, watercrafts, hospitals, or large commercial centres) a pneumatic network is present, comprising a large number of valve elements. Compression of the air is obtained using large industrial compressors, and the compressed air thus obtained is accumulated in large tanks at a given level of pressure, typically 12-16 bar. Said pressure, however, is generally too high for the users connected to the pneumatic network, this being the reason why the latter is equipped with numerous pressure reducers with the purpose of reducing the value of pressure of the air at inlet to the users.

Each pressure reducer is able to maintain downstream thereof a pre-set pressure value (by means of electronically controlled manual or automatic systems) and supplies a variable flowrate depending upon the user.

The mass flowrate at outlet from each pressure reducer is of course equal to the inlet flowrate, whilst, as is obvious, the pressure value of the air at outlet from each pressure reducer is markedly lower than the pressure value of the air at inlet thereto. An energy balance across each pressure reducer makes it possible to appreciate how the pressure drop across the reducer is directly proportional to the reduction of energy of the air flowing through it, with consequent dissipation of energy.

This, in general, occurs whenever, in a desired way or for physical causes, a drop in pressure is induced within a fluid. The loss of energy occurs by lamination, i.e., by dissipating, on account of the internal friction of the fluid, the amount of energy necessary to obtain the desired pressure level. It is recalled that the power of a fluid current, and hence, as a result, its energy, depends in a directly proportional way upon the pressure of the fluid.

Of course, the pressure losses by lamination are common to a plurality of components, whether these be flow-control valves, portions of duct with restricted section, or other components.

In greater detail, the process of lamination present within valve assemblies in a pneumatic network is given by a first step of acceleration of the fluid traversing the valve assembly and a second step of deceleration. To the first step there corresponds passage through a restricted section of the valve assembly, whilst to the second step there corresponds the flow of fluid through a divergent portion of the valve assembly itself. The loss of energy can be considered substantially negligible in the passage through the restricted section, whereas it is very high during traversal of the divergent section, where the motion of the fluid is markedly vorticose and there are very high gradients of velocity in directions perpendicular to that of the motion. This creates dissipation of energy by friction and hence production of heat.

The dissipated energy inevitably entails a considerable economic impact on the operating costs of a pneumatic system.

In general, during the design of a pneumatic network the main objective is to minimize leakages, without paying attention to the reduction of the losses by lamination. From a purely theoretical standpoint, it would simply be possible to limit the losses by lamination by producing compressed air at the same pressure as the pressure of use of the users. However, given the different type of users and the different operating pressures, said solution is substantially impracticable since it would require dimensioning a compressor for each user.

OBJECT OF THE INVENTION

The object of the present invention is to overcome the technical problems described previously.

In particular, the object of the present invention is to reduce the losses by lamination within a pneumatic network.

SUMMARY OF THE INVENTION

The object of the present invention is achieved by a valve assembly having the features forming the subject of the ensuing claims, which form an integral part of the technical disclosure provided herein in relation to the invention.

Resorting to an analogy of an electrical type, we may consider, for example, a transformer. The efficiency of a transformer is generally high because the energy losses inside it are minimal. In particular, a transformer generally reduces the output voltage with respect to the input voltage increasing, however, the current intensity. In this way, the product of the two quantities (voltage and current intensity) at input to and at output from the transformer is practically identical, which is indicative of minimal losses.

Transferring said concept to the case of a valve assembly, corresponding to the electric voltage is the difference in pressure across of the valve assembly itself, whilst corresponding to the current intensity is the flowrate. Following upon what has been said previously, given a constant flowrate maintained through the valve assembly, there is a marked decrease in pressure, which would correspond, on the basis of the analogy adopted, to a marked reduction of the current at output from the transformer.

The energy losses are proportional to the pressure drop within the valve assembly, i.e., to the amount that reduces the product of the flowrate and the pressure of the fluid at outlet with respect to the product of the corresponding quantities at inlet. Consequently, in the valve assembly according to the invention basically an increase in flowrate is created when a difference in pressure is set up across it so as to reintegrate the energy losses by lamination.

BRIEF DESCRIPTION OF THE ANNEXED DRAWINGS

The invention will now be described with reference to the annexed drawings, which are provided purely by way of non-limiting example and in which.

DETAILED DESCRIPTION OF THE INVENTION

Figure 1:
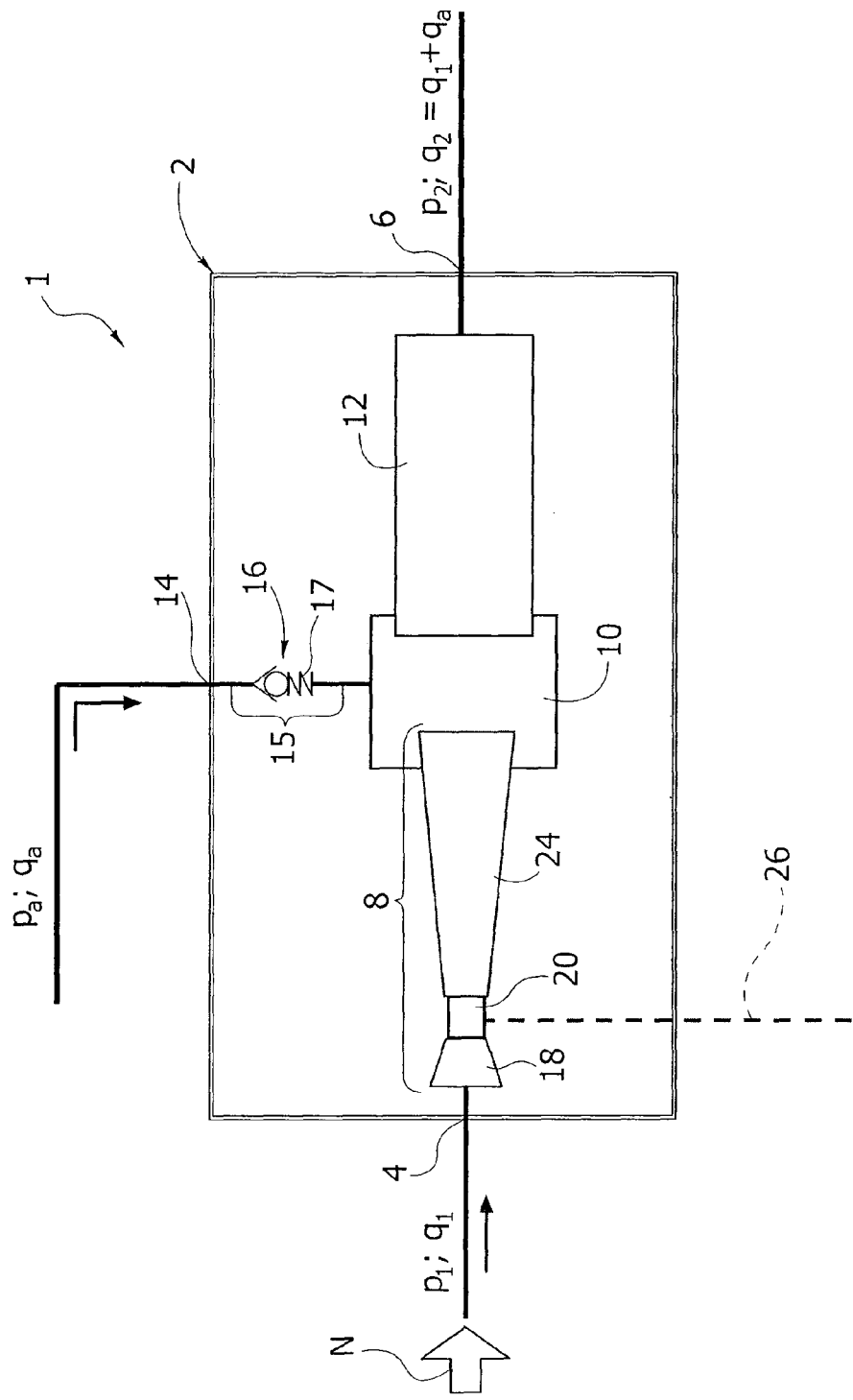
FIG. 1 is a schematic view of a valve assembly according to one embodiment of the present invention.

With reference to FIG. 1, designated by 1 is a valve assembly according to the present invention. The valve assembly 1 comprises a body 2 including a first inlet port 4 and a first discharge port 6. The body 2 moreover includes a main duct 8, fluid-dynamically set downstream of the inlet port 4 and in fluid communication therewith, an intake volume 10, fluid-dynamically set downstream of the main duct 8 and in fluid communication therewith, and an outlet nozzle 12, fluid-dynamically set downstream of the intake volume 10 and in fluid communication therewith and with the discharge port 6. The terms "upstream" and "downstream" here refer to a direction of flow of the fluid, which proceeds substantially from the inlet port 4 to the discharge port 6.

The intake volume 10 is moreover in fluid communication with a second inlet port 14 by means of an intake duct 15 inserted along which is a non-return valve 16 designed to enable a flow of fluid only from the inlet port 14 to the intake volume 10. Preferably, the non-return valve 16 is pre-loaded, for example with an elastic element 17, as illustrated schematically in FIG. 1.

The main duct 8 is substantially shaped like a convergent-divergent nozzle (so-called "De Laval nozzle") and comprises, in this embodiment, a convergent portion 18 in fluid communication with the inlet port 4, fluid-dynamically set downstream with respect thereto, a restricted-section portion 20, fluid-dynamically set downstream of the convergent portion 18 and in fluid communication therewith, and a divergent portion 24, fluid-dynamically set downstream of the restricted-section portion 20, in fluid communication therewith and moreover set fluid-dynamically upstream and in fluid communication with respect to the intake volume 10.

The restricted-section portion 20 has a variable passage area that can be modulated via an actuator assembly 26, which is herein represented schematically with a dashed line and will be described in detail hereinafter.

Figure 2:
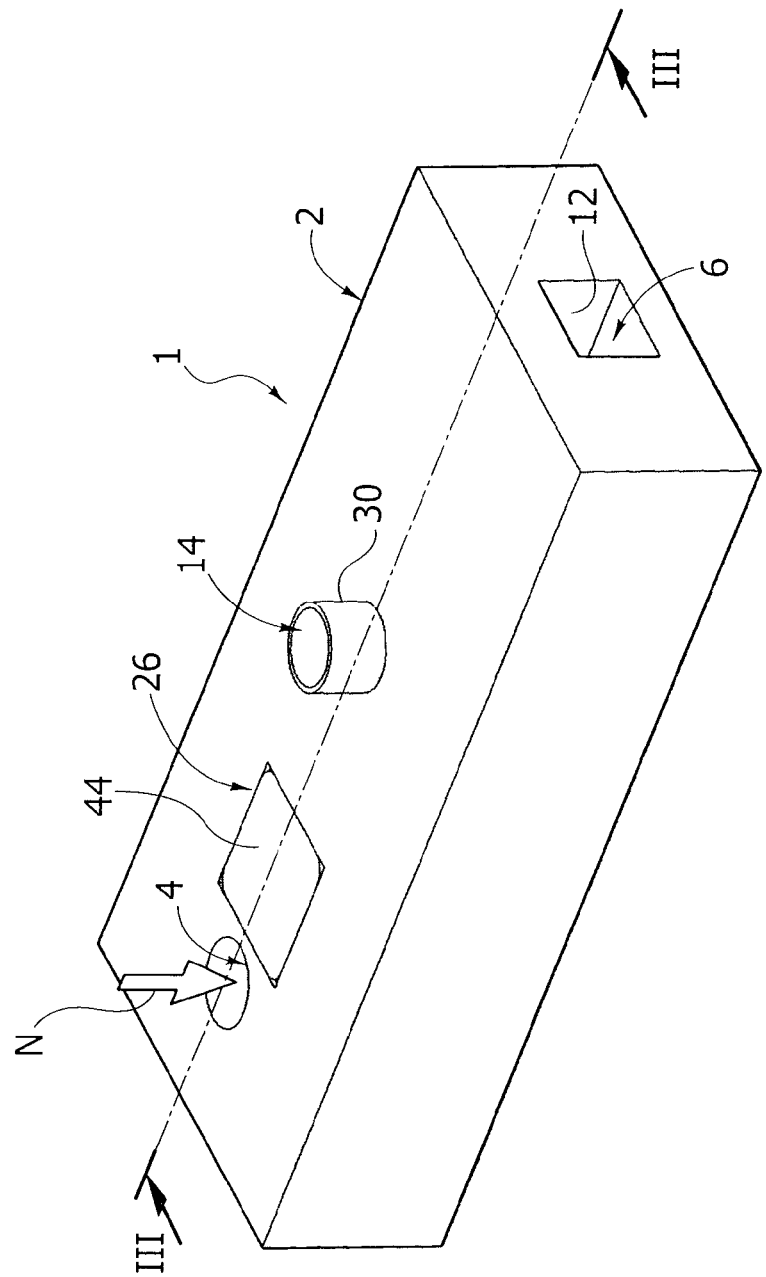
FIG. 2 is a perspective view of one embodiment provided by way of example of a valve assembly according to the invention.
Figure 3:
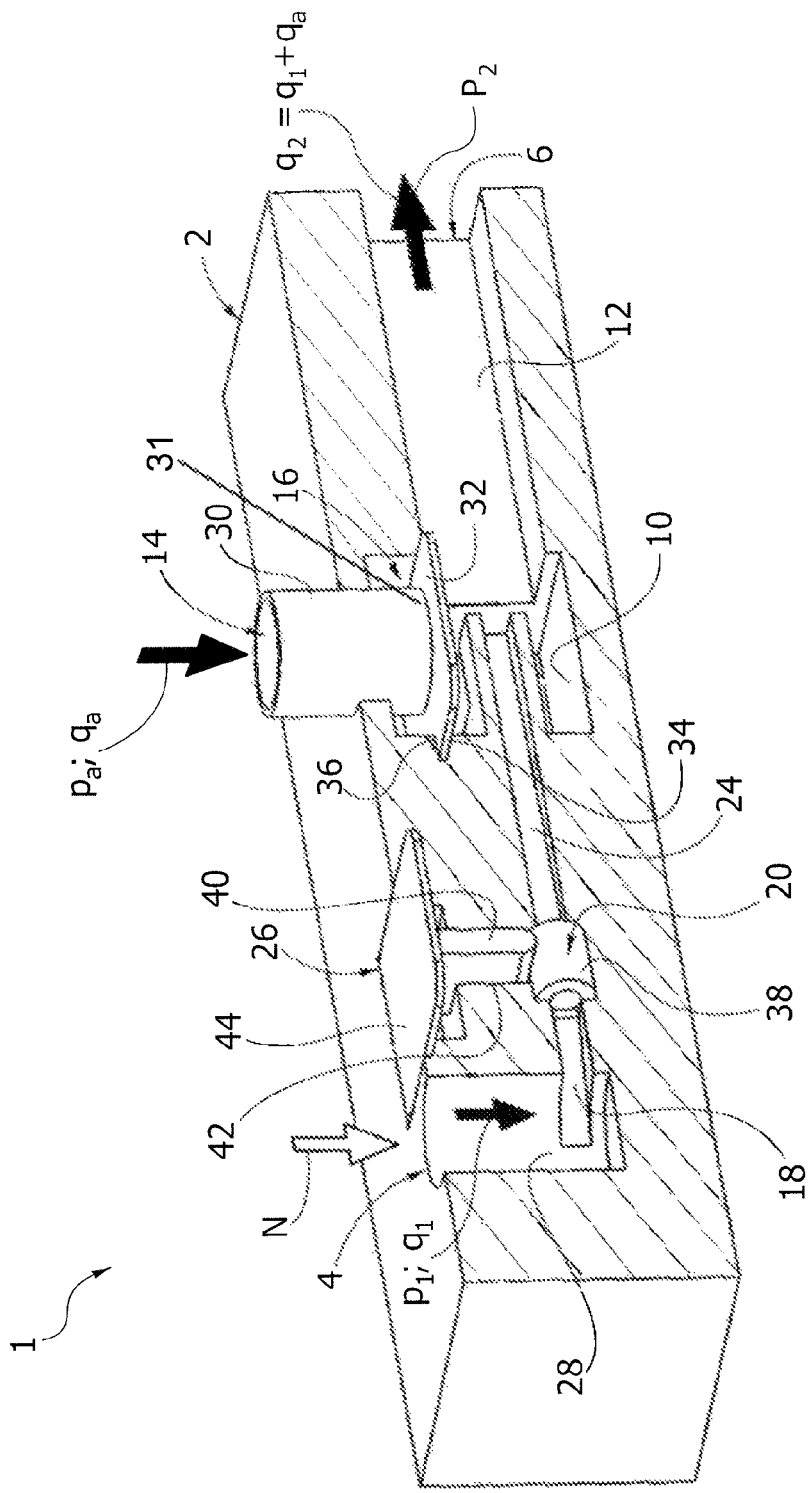
FIG. 3 is a perspective cross-sectional view according to the trace of FIG. 2.

A possible example of practical embodiment of the valve assembly 1, even though it is not the only embodiment and is not to be understood as in any way limiting the scope of the invention, is illustrated in FIGS. 2 and 3. The components that are identical to the ones described previously are designated by the same reference numbers.

The body 2 is illustrated in FIG. 2 as an element of a parallelepipedal shape, preferably made of metal, provided inside which are the duct 8, the intake volume 10, and the outlet nozzle 12. The first inlet port 4 and the convergent portion 18 of the main duct 8 are in fluid communication with one another by means of a cylindrical channel 28 substantially orthogonal to the main duct 8, whilst fitted in a region corresponding to the inlet port 14 is a sleeve 30. The sleeve 30 traverses partially the body 2 penetrating within the intake volume 10. Here, a corresponding end 31 of the sleeve 30 is in contact with a leaf 32, which is cantilevered at an edge 34 thereof in a groove 36 provided in the body 2 and is immersed within the volume 10.

The restricted-section portion 20 of the main duct 8 is here provided by means of a deformable tubular element 38 urging upon which is a mobile element 40 guided in a slit 42 made within the body 2.

The mobile element 40 is, in turn, arranged for co-operating with an elastically deformable membrane 44. It should be noted that the mobile element 40 and the membrane 44 in this embodiment define the actuator assembly 26.

With reference to FIGS. 1 to 3, operation of the valve assembly 1 is described in what follows.

The first inlet port 4 is fluid-dynamically connected to a pneumatic network schematically indicated by an arrow designated by the letter N. The first inlet port is configured for handling a first flow of compressed air $q_1$ coming from the pneumatic network N and having a pressure $p_1$, higher than the ambient pressure, designated by $p_a$.

The fluid flow $q_1$ is sent on from the first inlet port 4 to the main duct 8, where it traverses first the convergent portion 18, then the restricted-section portion 20, and finally the divergent portion 24, reaching the intake volume 10 and the outlet nozzle 12, and coming out from the discharge port 6. It should be noted that, by varying the passage area of the portion 20 it is possible to vary the flow conditions within the duct 8 and it is moreover possible to annul the flow at outlet from the discharge port 6 (by occluding the portion 20 completely).

As is known, the flow regime within the main duct 8 depends upon the ratio of the pressures across the main duct 8 itself. For the purposes of the ensuing description, the ratio $p_1/p_2$ is considered as a reference.

In particular, for values of the ratio $p_1/p_2$ greater than 2 (two), the flow in the main duct 8, in particular in the divergent portion 24, is of a supersonic type, with a marked gradient of velocity in the directions perpendicular to the motion of the fluid.

The supersonic flow through the divergent portion 24 creates a marked depression within the intake volume 10, which causes the opening of the non-return valve 16. In fact, the latter is subjected to the action of the ambient pressure, designated by $p_a$, (which develops through the inlet port 14), which tends to open the valve 16, of the pressure within the intake volume 10, and of the elastic element 17, which, instead, tend to keep it closed.

In the conditions described above, the action of the ambient pressure $p_a$ clearly prevails causing opening of the valve 16, which enables entry of a second air flow $q_a$ at ambient pressure $p_a$ through the second inlet port 14 towards the intake volume 10. The flow $q_a$ adds to the air flow $q_1$ that passes through the duct 8, and in this way the discharge port 6 drains off a fluid flow equal to the sum of the first flow $q_1$ and second flow $q_a$.

When the value of pressure within the intake volume 10 is higher than the value of the ambient pressure $p_a$, the one-way valve 16 recloses preventing part of the flow $q_1$ from being dispersed into the environment. The flow of air $q_a$ taken in from the environment is adjusted automatically on the basis of the operating conditions. In particular, when the energy of the fluid current that flows within the main duct 8 is not sufficient to produce the intake of the air flow $q_a$, the fluid communication between the intake volume 10 and the environment through the inlet port 14 is disabled. The pressure $p_2$ is of course determined by the user connected to the discharge port of the valve assembly 1.

With reference to the embodiment illustrated in FIGS. 2 and 3, the non-return valve 16 is provided by the sleeve 30 and by the leaf 32 in the presence of a flow through the duct 8 the leaf 32, which normally bears upon the end 31 so occluding the sleeve 30, is in view of an environment that is at pressure $p_a$ and is immersed in the intake volume 10. In this way, the leaf 32 undergoes deflection towards the inside of the volume 10, which opens a passageway for the air coming from the environment through the sleeve 30. The person skilled in the branch will, on the other hand, appreciate that the leaf 32 hence performs the functions that in the schematic representation of FIG. 1 are associated to the elastic element 17 and to the mobile element of the valve 16.

The energy losses by lamination are significantly reduced since the flow of air that must be delivered from the tank of the pneumatic network to the individual users and thus undergoes lamination is substantially reduced by draining a quantity of the necessary flow from the external environment (the flow $q_a$).

Of course, the valve assembly 1 according to the invention can be applied in a plurality of contexts, not limited to the one described herein.

The variation of the passage area of the restricted-section portion 20 can be provided in a plurality of different ways, according to the needs.

In the embodiment illustrated in FIGS. 2 and 3, the variation of the passage area is obtained by mechanical action (manually or with a remote pressure signal) on the membrane 44, which by deforming causes a displacement of the mobile element 40 and a consequent transverse deformation of the deformable tubular element 38, which in turn determines a greater or lesser "choking" of the passage area of the portion 20.

Figure 4:
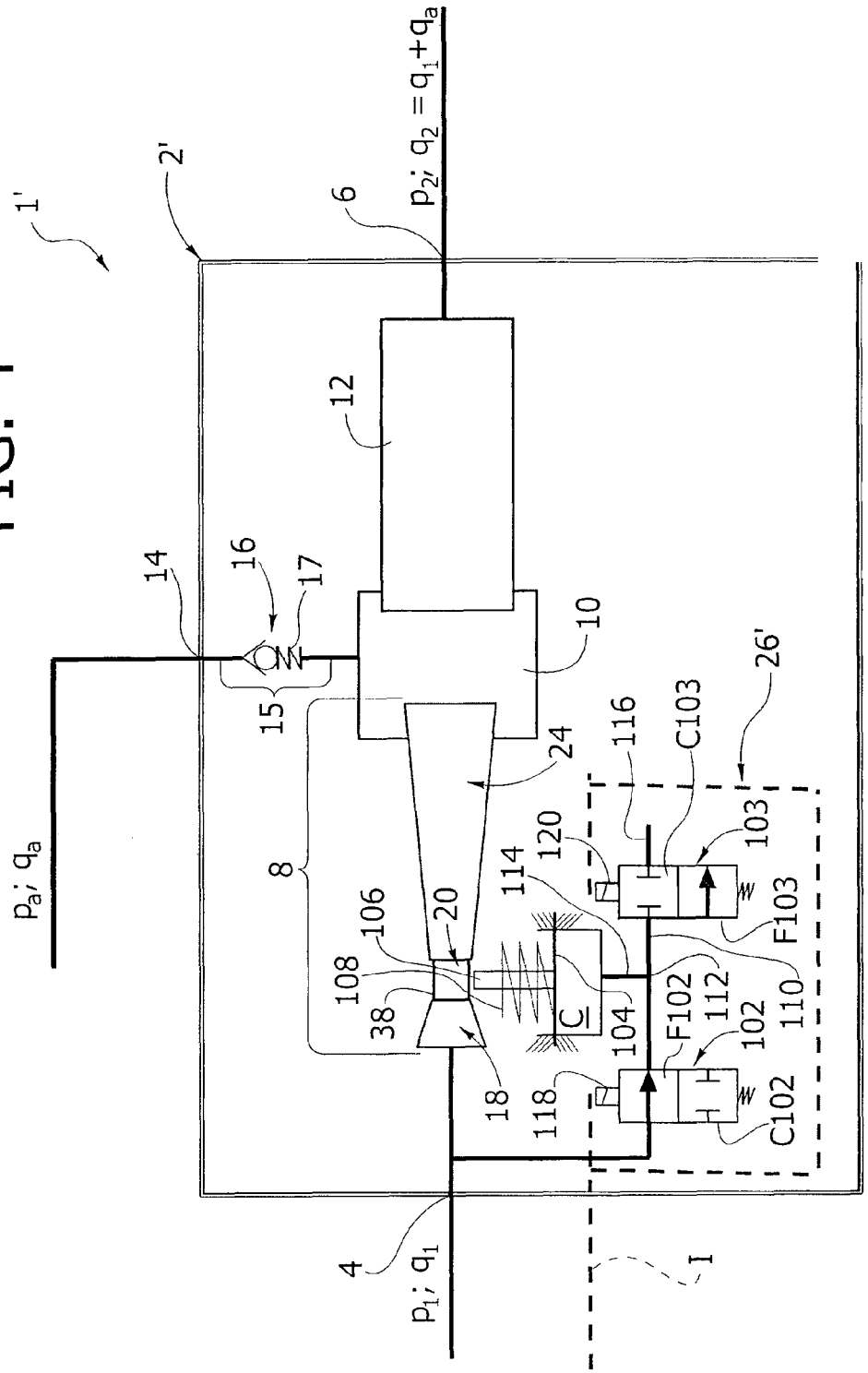
FIG. 4 is a schematic view illustrating a first variant of the valve assembly of FIG. 1.

With reference to FIG. 4, a solution with electronic control may be alternatively envisaged. With reference to FIG. 4, the reference number 1' designates a first variant of the valve assembly according to the present invention.

The valve assembly 1' differs from the valve assembly 1 as regards construction of the actuator assembly, which, in this variant, is designated by 26'. The remaining components of the valve assembly 1' that are identical to the ones already described for the valve assembly 1 are designated by the same reference numbers.

The valve assembly 1' comprises a body 2', including the inlet ports 4, 14, the duct 8, the intake volume 10, the outlet nozzle 12, the one-way valve 16, and the discharge port 6. The further identical components, designated by the same reference numbers adopted previously, will not be described again. Installed inside the body 2' is the actuator assembly 26', the structure of which will be described in detail in what follows.

The actuator assembly 26' comprises a pneumatic actuator designated by the reference number 100, a charge valve 102, and a discharge valve 103. The pneumatic actuator 100 comprises a control chamber, designated by the letter C and delimited on one side by a membrane 104 rigidly connected to a stem 106. The movement of the membrane 104 is countered by an elastic element 108, set coaxial to the stem 106.

Each of the two valves 102, 103 is preferably a microsolenoid pneumatic valve with two ports and two positions (comprising an open position and a closed position) integrated within the body 2'.

In particular, the charge valve 102 comprises an open operative position, designated by the reference number F102, and a closed operative position, designated by the reference number C102. Likewise, the discharge valve 103 comprises an open operative position F103 and a closed operative position C103. The valves 102, 103 are fluid-dynamically connected to one another by a connection channel 110 comprising a joint 112, branching off from which is a channel 114 in fluid communication with the control chamber C of the pneumatic actuator 100.

The charge valve 102 is moreover in fluid communication with the inlet port 4 upstream of the convergent portion 18. The discharge valve 103 is, instead, in fluid communication with a blow-off duct into the atmosphere, designated by 116.

Each of the valves 102, 103 can be actuated by means of a respective solenoid 118, 120 driven by a control signal I.

In general, as will emerge more clearly from the ensuing description, the operative position (open or closed) assumed at the same instant by each of the two valves 102, 103 is not in general the same.

With reference to FIG. 4, the valve assembly 1' operates identically to the valve assembly 1 described previously, and only the modalities with which a variation of the area of passage of the restricted-section portion 20 is governed vary. The restricted-section portion 20 is once again provided by the deformable tubular element 38.

In particular, to govern a reduction of the section of passage of the restricted-section portion 20 an electronic control unit (not visible here) sends the signal I to the valves 102, 103 in such a way that the position represented in FIG. 4 is maintained, where the charge valve 102 is in the open position F102 in which it enables a flow of air from the inlet port 4 to the chamber C, whilst the discharge valve 103 is in the closed position C103 in which it prevents discharge of air into the atmosphere through the blow-off duct 116.

In this way, the air within the control chamber C is pressurized, thus producing a movement of the membrane 104 and of the stem 106, which deforms the deformable tubular element 38 in a transverse direction reducing the area of passage of the restricted-section portion 20.

Instead, in the case where it is desired to increase the passage area of the restricted-section portion 20, the electronic control unit mentioned above ceases to send the signal I to the valves 102, 103, which causes simultaneous switching thereof into a position such that the valve 102 is in the closed position C102 and prevents flow of fluid from the inlet port 4 to the control chamber C, whilst the discharge valve 103 is in the open position F103 and causes discharge of fluid from the chamber C into the atmosphere, thus causing a retraction of the stem 106 and a consequent release of the action on the deformable tubular element 38, which results in an increase in the passage area of the latter.

It should be noted that the open positions F102, F103 of the valves 102, 103 are of a one-way type, i.e., the flow of fluid is allowed only from the inlet port 4 to the control chamber C and from the control chamber C to the atmosphere, respectively.

Figure 5:
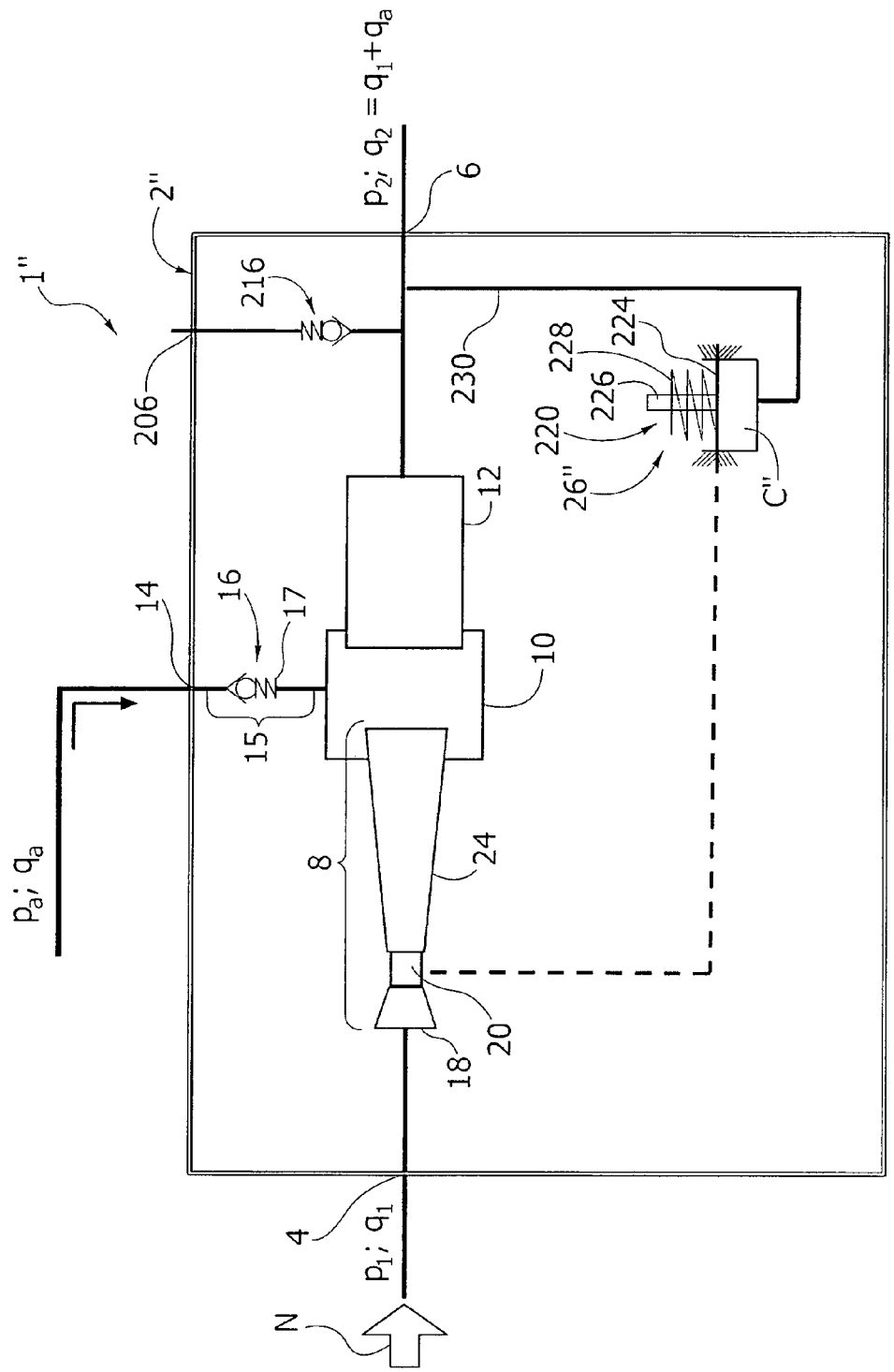
FIG. 5 is a schematic view of a second variant of the valve assembly of FIG. 1.

With reference to FIG. 5, a second variant of the valve assembly according to the present invention is designated by the reference number 1".

The valve assembly 1", as will emerge clearly from the ensuing description, is here configured so as to perform the function of pressure reducer.

The valve assembly 1" differs from the valve assemblies 1, 1' in the embodiment of the actuator assembly, which in this variant is designated by 26".

The valve assembly 1" comprises a body 2" including the inlet ports 4, 14, the duct 8, the intake volume 10, the outlet nozzle 12, the one-way valve 16, and the discharge port 6. The further identical components, designated by the same reference numbers as the ones adopted previously, will not be described again. Installed inside the body 2 is the actuator assembly 26", the structure of which will be described in detail in what follows, and moreover provided in the body 2" is a second discharge port 206 in fluid communication with the outlet nozzle 12 and the discharge port 6 through a second non-return valve designated as a whole by the reference number 216. The non-return valve 216 is designed to enable a flow of fluid only from the outlet nozzle 12 to the second discharge port 206.

Likewise set within the body 2" is the actuation assembly 26" comprising in this embodiment a pneumatic actuator 220, including a control chamber C", delimited on one side by a membrane 224, which is connected to a stem 226 and the movement of which is countered by an elastic element 228, which urges upon the membrane 224 itself. The chamber C" is in fluid communication with the discharge port 6 by means of a drive channel 230.

Operation of the valve assembly 1" is substantially similar to that of the valve assemblies 1, 1', but the modalities with which the variation of the area of passage of the restricted-section portion 20 is operated differ principally in that the valve assembly 1" is configured for functioning as a pressure reducer.

The valve assembly 1" is configured for guaranteeing on the discharge port 6 a pressure $p_2$ that is substantially constant and lower than the pressure $p_1$. The pressure on the discharge port 6 is sent back into the control chamber C" thanks to the drive channel 230 in such a way that the action thereof on the membrane 224 is such as to develop a force that causes movement of the stem 226 against the action of the elastic element 228. Said elastic element basically supplies a pressure for calibration of the pressure reducer on the basis of which it is possible to modulate the area of passage of the restricted section 20, thus guaranteeing the required pressure on the discharge port 6.

In the schematic representation of FIG. 4, the connection with a dashed line can indicate both the possibility of direct action of the actuator 220 on the passage area of the portion 20, and a remote action, which in turn produces actuation of a further actuator or device arranged for varying the passage area of the portion 20.

Figure 6:
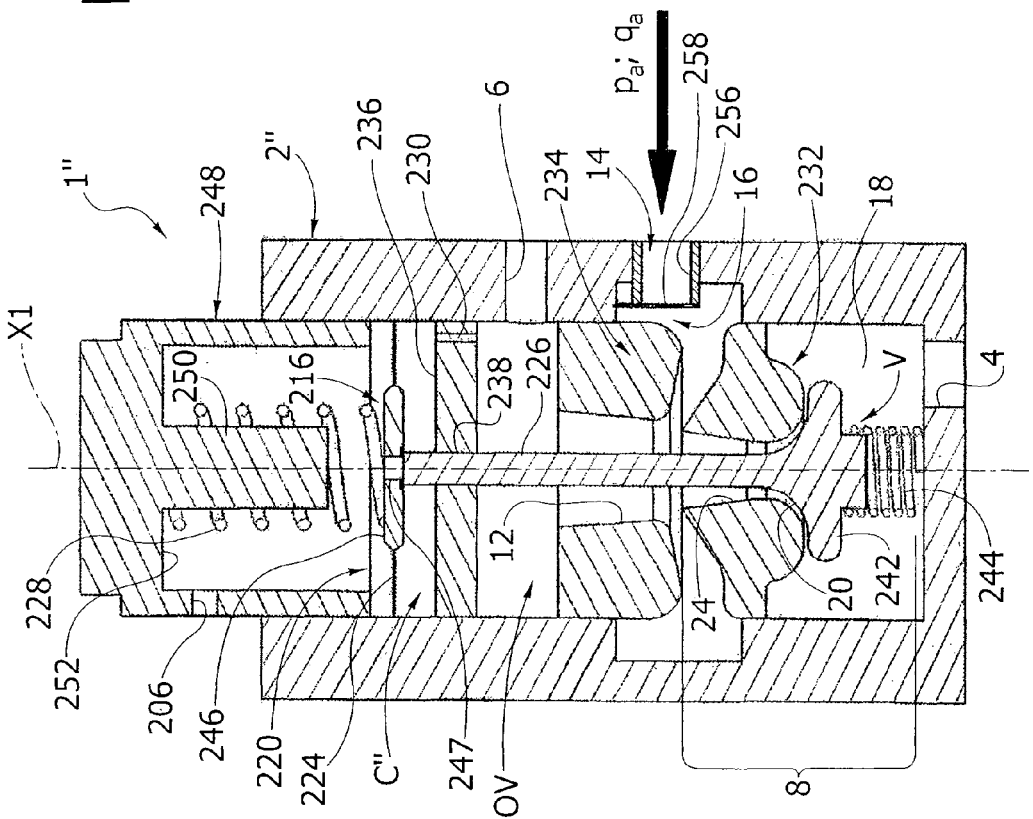
FIG. 6 is a cross-sectional view provided by way of example of one embodiment of the invention corresponding to FIG. 5.

To understand further operation of the valve assembly 1", reference may be made to the practical embodiment, provided purely by way of example, illustrated in FIG. 6.

FIG. 6 illustrates a practical embodiment, here provided purely by way of example that in no way limits the scope of the invention, of the valve assembly 1". The components that have already been described are designated by the same reference numbers as those used in the previous figures.

In this embodiment, the body 2" is substantially a box-shaped element having the inlet port 4 and the discharge port 6 provided as through holes made in walls thereof.

The inlet and outlet ports 4, 6 are in communication with an internal volume V arranged within which, all coaxial to each other with respect to a longitudinal axis X1, are a first outflow element 232, provided in which are the restricted-section portion 20 and the divergent portion 24, a second outflow element 234, provided within which is the outlet nozzle 12, and a diaphragm 236 traversed by a central through hole 238.

The intake volume 10 is consequently comprised between the first and second outflow elements 232, 234. It should moreover be noted that provided in the diaphragm 236 is the drive channel 230.

A mushroom-shaped element 240 traverses the outflow elements 232, 234 and slidably engages within the hole 238. The mushroom-shaped element 240 comprises the stem 226 and terminates, at a first end of its own, with a plate 242 axially supported by an elastic positioning element 244 inside the volume V.

The membrane 224 is set on an opposite side of the diaphragm 236 with respect to the second outflow element 234 and comprises a disc-shaped element 246 fixed thereto and set bearing upon a second end of the mushroom-shaped element 240. The disc-shaped element 246 further comprises a central orifice 247, which is configured for being closed by the stem 226, as will emerge more clearly from the ensuing description.

A cup-shaped element 248 is inserted within the body 2 at an opposite end with respect to the inlet port 4 and on an opposite side of the membrane 224 with respect to the diaphragm 236. The cup-shaped element 248 comprises a shank 250, fitted on which is the elastic element 228, here, in particular, a cylindrical helical spring.

The elastic element 228 has ends comprised between and, respectively, in contact with an annular contrast surface 252 of the cup-shaped element 248 and the disk-shaped element 246. It should be noted that the elastic element 228, the disk-shaped element 246, and the stem 226 functionally define the one-way valve 216.

Moreover provided on a lateral surface of the cup-shaped element 248 is the second discharge port 206, made as a through hole.

With reference to FIGS. 5 and 6, it should moreover be noted that:

the diaphragm 236 and the membrane 224 delimit the control chamber C"; moreover, the diaphragm 236 divides the chamber C" from an outlet volume designated by OV in FIG. 6, in fluid communication with the discharge port 6;

the one-way valve 16 is provided here, with modalities similar to the ones described previously with reference to FIGS. 2 and 3, by means of a sleeve 256 inserted within the discharge port 14 and configured for occlusion by means of a leaf 258, which is cantilevered at one edge thereof within the body 2" and is immersed in the intake volume 10 and subject to the ambient pressure $p_a$; and the pneumatic actuator 220 is substantially constituted within the body 2" by the diaphragm 236, by the mushroom-shaped element 240, which integrates the stem 226, by the membrane 224, and by the elastic element 228.

With reference to FIG. 6, through the inlet port 4 a first air flow $q_1$ is introduced coming from the pneumatic network N and having a pressure $p_1$. The internal geometry of the valve assembly 1" forces the air flow $q_1$ to pass through the first outflow element 232. It should be noted that the fraction of the volume V comprised between the inlet port 4 and the outflow element 232 functionally provides the convergent portion 18 of the duct 8.

The intake of a second air flow $q_a$ from the external environment (hence at ambient pressure $p_a$) through the inlet port 14 towards the intake volume 10 is obtained by means of the one-way valve 16 according to the modalities described previously.

Of course, a user connected to the discharge port 6 receives an air flow $q_2$ equal to the sum of the flows $q_1$ and $q_a$, which are both drained off (simultaneously) by the discharge port 6. The air that flows out through the discharge port is moreover first collected within the outlet volume OV.

The variation of the area of passage of the restricted-section portion 20 is here provided by means of axial movement, i.e., along the axis X1, of the mushroom-shaped element 240. The chamber C" receives, by means of the drive channel 237, pressurized air substantially at the same value of pressure $p_2$ as that of the air flow $q_2$ passing through the discharge port 6.

The pressure $p_2$ is transferred onto the membrane 224, producing an action antagonistic to the action of the elastic element 228.

In particular, the action of the pressure $p_2$ on the membrane 224 is such that there is an axial compression of the elastic element 228 and a consequent approach of the plate 242 to the first outflow element 232. This causes a reduction of the passage area of the restricted-section portion 20. In general, the mechanical balance between the pressures within the chamber C" and the elastic element 228 enables maintenance on the discharge port 6 of a substantially constant pressure equal to the sum of the ambient pressure and the calibration pressure of the elastic element 228. By the term "calibration pressure" is meant a pressure that, applied on a surface of influence (in this case, the membrane 224) on which the elastic element 228 urges, produces a force balancing the elastic force developed by the element 228 itself.

It should moreover be noted that, in the case where the pressure $p_2$ is excessively high, deflection of the membrane 224 may be such as to cause a detachment of the disc-shaped element 246 from the stem 226, with consequent opening of a passageway for the air through the central orifice 247. Simultaneously, also a closing of the one-way valve 16 would be brought about. Hence, as described previously, the disc-shaped element 246 and the elastic element 228 functionally provide the one-way valve 216.

Use of the valve assembly 1" as pressure reducer allows to supply to the user the air flow $q_2$ required and at the desired pressure, but it allows to drain from the pneumatic network N a flow $q_1$ smaller than that consumed by the user. The difference in flow is drawn in from the environment. In this way, the energy losses are proportional to the difference in pressure across the valve assembly 1" but inversely proportional to the difference between the flows $q_2 - q_1$.

In practice, a valve assembly according to the invention presents a series of considerable advantages. In the first place, it is easy to install on any pneumatic network upstream of any user, without requiring adaptation of the user or of the pneumatic network, to the advantage of ease of installation, diffusion, and contained costs.

Moreover, the inventors have found, via calculations and experimental tests, that on average, and in a way substantially independent of the size of the pneumatic network, the saving of flow is in the region of 60% as compared to the flow consumed in the case of use of valve elements of a known type with a corresponding net economic saving, the reason for this being, as has been described, that part of the flow is drawn in directly from the external environment. Hence, it emerges clearly how the economic benefits are proportional to the size of the pneumatic network, which constitutes an advantage of no minor importance.

Of course, the details of construction and the embodiments may vary widely with respect to what is described and illustrated herein by way of example, without thereby departing from the sphere of protection of the present invention, as defined in the annexed claims.

The invention claimed is:

1. A valve assembly configured for use in a pneumatic network, including a body comprising:
   a first inlet port and a first discharge port for air, wherein said first inlet port is configured for draining off a first fluid flow,
   a main duct including:
      a convergent portion, fluid-dynamically set downstream of said first inlet port;
      a restricted-section portion, fluid-dynamically set downstream of said convergent portion and having a variable passage area; and
      a divergent portion, fluid-dynamically set downstream of said restricted-section portion,
   an actuator assembly, said actuator assembly comprising an actuator coupled to a movable member, said member movable to control a variation in the passage area of said restricted-section portion in response to said actuator receiving a control signal initiated by a user, said control signal independent of conditions of the fluid inside the valve assembly;
   an intake volume set downstream of said divergent portion and in fluid communication therewith and with said first discharge port; and
   a second inlet port in fluid communication with said intake volume by valve means configured for enabling an intake of a second fluid flow through said second inlet port and towards said intake volume, wherein said second fluid flow is drained off through said first discharge port together with said first fluid flow.

2. The valve assembly according to claim 1, wherein said valve means comprise a first unidirectional valve designed to enable a fluid flow only from said second inlet port to said intake volume.

3. The valve assembly according to claim 2, wherein said first unidirectional valve comprises a sleeve, which is inserted in a position corresponding to said second inlet port and can be occluded by means of a leaf, which is cantilevered in said body at one edge thereof and is immersed in said intake volume.

4. The valve assembly according to claim 1, wherein said restricted-section portion comprises a deformable tubular element.

5. The valve assembly according to claim 4, wherein said actuator assembly comprises:
   a pneumatic actuator comprising a control chamber delimited on one side by a membrane;
   a stem connected to said membrane and urging upon said deformable tubular element; and
   a charge valve and a discharge valve, each comprising an open position and a closed position
   wherein:
   said charge valve is moreover in fluid communication with said first inlet port upstream of said convergent portion;
   said discharge valve is in fluid communication with a blow-off duct into the atmosphere;
   said charge valve and discharge valve are in fluid communication with one another by means of a connection channel, wherefrom a channel in fluid communication with said control chamber of said pneumatic actuator branches, and
   said charge valve and discharge valve can be actuated for enabling, respectively, a fluid inflow towards and a fluid discharge from said control chamber.

6. The valve assembly according to claim 1, further comprising an exit nozzle, fluid-dynamically set downstream of said intake volume.

7. The valve assembly according to claim 1. wherein said control signal is independent from pressure conditions of the fluid inside the valve assembly.

8. The valve assembly according to claim 1 wherein said actuator is not in fluid communication with an interior of the intake volume or a duct interior of the duct.

9. The valve assembly according to claim 1 wherein said actuator avoids contact with the fluid.

* * * * *